United States Patent
Yannuzzi et al.

(10) Patent No.: US 11,689,919 B2
(45) Date of Patent: Jun. 27, 2023

(54) DYNAMIC EXCHANGE OF METADATA

(71) Applicant: Cisco Technology, Inc., San Jose, CA (US)

(72) Inventors: Marcelo Yannuzzi, Nuvilly (CH); Herve Muyal, Gland (CH); Benjamin W. Ryder, Lausanne (CH); Marco Trinelli, Lausanne (CH); Bart A. Brinckman, Nevele (BE)

(73) Assignee: Cisco Technology, Inc., San Jose, CA (US)

( * ) Notice: Subject to any disclaimer, the term of this patent is extended or adjusted under 35 U.S.C. 154(b) by 331 days.

(21) Appl. No.: 17/248,366

(22) Filed: Jan. 21, 2021

(65) Prior Publication Data
US 2022/0232375 A1  Jul. 21, 2022

(51) Int. Cl.
*H04W 12/06* (2021.01)
*H04W 12/69* (2021.01)
*H04W 8/20* (2009.01)
*H04W 76/11* (2018.01)

(52) U.S. Cl.
CPC ............. *H04W 12/06* (2013.01); *H04W 8/20* (2013.01); *H04W 12/69* (2021.01); *H04W 76/11* (2018.02)

(58) Field of Classification Search
CPC ....... H04W 12/06; H04W 8/20; H04W 12/69; H04W 76/11; H04W 12/069; H04W 76/12; H04L 63/029; H04L 63/0815; H04L 63/18
See application file for complete search history.

(56) References Cited

U.S. PATENT DOCUMENTS

| | | | |
|---|---|---|---|
| 8,058,985 B2* | 11/2011 | Dobson | E05C 19/186 340/545.1 |
| 8,418,234 B2* | 4/2013 | Hinton | H04L 63/0884 713/168 |
| 10,667,135 B2* | 5/2020 | Grayson | H04W 12/084 |
| 10,813,042 B1 | 10/2020 | Gundavelli et al. | |
| 10,848,958 B2 | 11/2020 | Grayson et al. | |
| 2007/0143829 A1* | 6/2007 | Hinton | H04L 63/0815 726/8 |
| 2015/0264051 A1 | 9/2015 | Hoggan | |
| 2015/0379796 A1* | 12/2015 | Glasgow | G07C 9/00571 340/5.51 |

(Continued)

FOREIGN PATENT DOCUMENTS

WO  2020046348 A1  3/2020

OTHER PUBLICATIONS

F. Adrangi, "Chargable User Identity," Network Working Group, Jan. 2006, 11 pages.

(Continued)

*Primary Examiner* — Baotran N To
(74) *Attorney, Agent, or Firm* — Patterson + Sherdan, LLP

(57) ABSTRACT

A method includes receiving, at an access node, a connection request from a device and in response to the connection request, establishing a connection with an identity provider. The device, the access node, the local network, and the identity provider are members of an identity federation. The method also includes, after the device is authenticated with the identity provider, sending or receiving, to or from the identity provider and by the access node, data linking the device to an item and an owner of the device.

20 Claims, 4 Drawing Sheets

(56) References Cited

U.S. PATENT DOCUMENTS

| | | |
|---|---|---|
| 2017/0103595 A1* | 4/2017 | Taylor ................ G06K 7/10881 |
| 2017/0171184 A1 | 6/2017 | Shah et al. |
| 2020/0162889 A1 | 5/2020 | Desai et al. |
| 2020/0163013 A1 | 5/2020 | Grayson et al. |
| 2020/0219339 A1* | 7/2020 | Glasgow ............ G07C 9/00174 |

OTHER PUBLICATIONS

Elena M. Torroglosa-Garica, "Enabling Roaming Across Heterogeneous IoT Wireless Networks: LoRaWAN Meets 5G," May 28, 2020, 17 pages.

* cited by examiner

DYNAMIC EXCHANGE OF METADATA

TECHNICAL FIELD

Embodiments presented in this disclosure generally relate to network communications. More specifically, embodiments disclosed herein relate to communicating metadata after authentication in an identity federation.

BACKGROUND

Identity federations, such as OpenRoaming, increase the mobility of devices by allowing the devices to connect to many different, geographically separated networks. As the device moves from location to location, the device can authenticate itself with the federation and be granted access to the local network. The local network, however, receives little to none additional information about the device that the local network can use to better service the device.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

According to an embodiment, a method includes receiving, at an access node, a connection request from a device and in response to the connection request, establishing a connection with an identity provider. The device, the access node, the local network, and the identity provider are members of an identity federation. The method also includes, after the device is authenticated with the identity provider, sending or receiving, to or from the identity provider and by the access node, data linking the device to an item and an owner of the device. Additional embodiments include an apparatus that performs this method.

EXAMPLE EMBODIMENTS

This disclosure describes an access node that uses information from an identity provider of an identity federation to provide additional services for a connecting device. For example, the device may be a wireless network interface coupled to a shipping container. When the device authenticates itself through the identity provider and connects to the access node of a local network, the access node may receive additional information about the device or the shipping container from the identity provider. For example, the access node may receive information about an item in the shipping container, an owner of the shipping container, a digital key that can unlock the shipping container, and other network interfaces coupled to the shipping container. The access node then uses this information to provide additional services to the device, the shipping container, and its handlers. For example, the access node can link the device to the item in the shipping container or the owner of the shipping container. As another example, the access node can provide the key to a handler of the shipping container. As yet another example, the access node can identify and discard connection requests from other devices coupled to the shipping container. Additionally, the access node can notify a suitable handler to move the shipping container to an appropriate location. In this manner, the access node is supplied information that provides improved services to the device, in particular embodiments.

Figure 1:
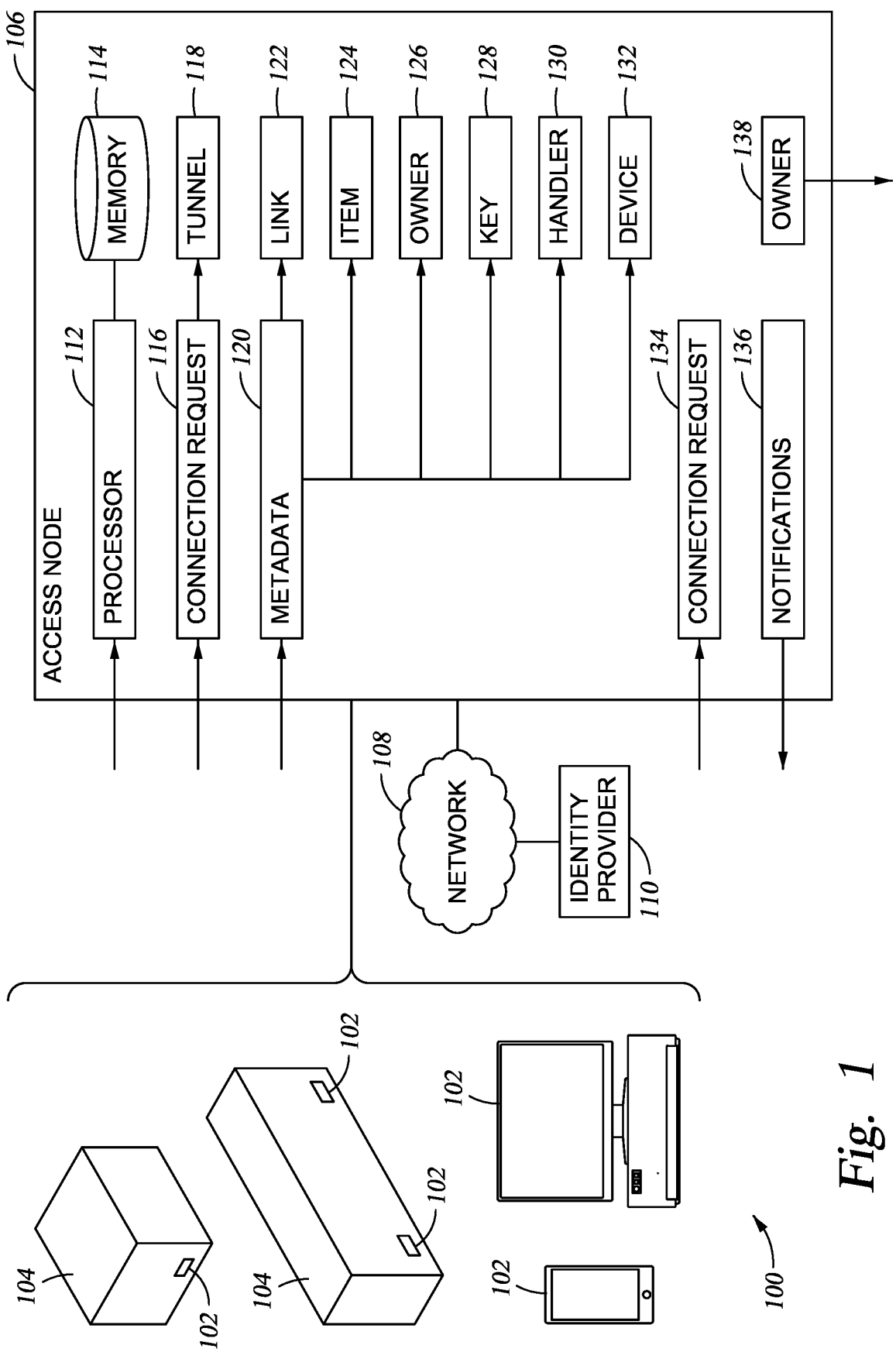
FIG. 1 illustrates an example system.

FIG. 1 illustrates an example system 100. As seen in FIG. 1, the system 100 includes one or more devices 102, an access node 106, a network 108, and an identity provider 110. Generally, the devices 102 connect to the network 108 through the access node 106 after performing an authentication process with the identity provider 110. The identity provider 110 also communicates additional information about the device 102 to the access node 106. The access node 106 may use this information to provide enhanced services to the device 102. In particular embodiments, the information provided to the access node 106 allows the access node 106 to link the device 102 to an item or owner associated with the device 102. Additionally, the access node 106 uses this information to determine an appropriate handler or other devices associated with the device 102.

The system 100 may include any number of local and roaming devices 102. Each device 102 may be any suitable device for connecting and communicating through the access node 106. For example, each device 102 may include an interface through which the device 102 connects and communicates with the access node 106. The interface may include any number of radios that connect and communicate with the access node 106 using any suitable communication protocol (e.g., WiFi, cellular, Bluetooth, Near-Field, etc.). When a device 102 is within the range of the access node 106, the device 102 may attempt to connect to the access node 106. The access node 106 may facilitate authentication between the device 102 and the identity provider 110. After the device 102 is authenticated, the access node 106 may allow the device to send and receive communications over the network 108 through the access node 106.

In certain embodiments, the device 102 may be coupled to a container 104. For example, the device 102 may be coupled to a shipping crate or a shipping box. In some instances, multiple devices 102 are coupled to the container 104. The device 102 may be attached directly to the container 104 (e.g., by adhesives or fasteners). Additionally, or alternatively, the device 102 may be placed within a separate container that is coupled to the container 104 (e.g., by adhesives or fasteners). As the container 104 is moved or shipped, the device 102 may be moved within range of one or more access nodes 106. For example, as the container 104 is shipped to different locations, the device 102 may connect to access nodes 106 at the different shipping locations (e.g., ports, warehouses, airports, train or bus stations, etc.) After the device 102 has been authenticated, the identity provider 110 may provide the access node 106 information about the device 102 or the container 104 that allows the access node 106 to provide enhanced services to the device 102.

A container 104 may have multiple devices 102 attached so that the container 104 may form a connection with many different types of access nodes 106. For example, an originator of the container 104 may not know the communication protocols used by the access nodes 106 on the shipping path of the container 104. By attaching multiple devices 102 that communicate over multiple protocols, the originator may ensure that the container 104 can form connections to different access nodes 106 along the shipping path of the container 104.

The device 102 may also be a standalone device as opposed to a device coupled to a container 104. As an example and not by way of limitation, the device 102 may be a computer, a laptop, a wireless or cellular telephone, an electronic notebook, a personal digital assistant, a tablet, or any other device capable of receiving, processing, storing, or communicating information with other components of the system 100. The device 102 may be a wearable device such as a virtual reality or augmented reality headset, a smart watch, or smart glasses. The device 102 may also include a user interface, such as a display, a microphone, keypad, or other appropriate terminal equipment usable by the user 102. The device 102 may include a hardware processor, memory, or circuitry configured to perform any of the functions or actions of the device 102 described herein. For example, a software application designed using software code may be stored in the memory and executed by the processor to perform the functions of the device 102. As the device 102 moves from location to location (e.g., as a user transports the device 102 to different locations), the device 102 may connect with the access nodes 106 at these locations.

The access node 106 controls access to the network 108. In some embodiments, the access node 106 may be a part of the network 108, which may be a local network. As seen in FIG. 1, the access node 106 includes a processor 112 and a memory 114, which are configured to perform any of the functions or actions of the access node 106 described herein. In particular embodiments, the access node 106 provides enhanced services to connecting devices 102 based on information received from the identity provider 110.

The processor 112 is any electronic circuitry, including, but not limited to microprocessors, application specific integrated circuits (ASIC), application specific instruction set processor (ASIP), and/or state machines, that communicatively couples to memory 114 and controls the operation of the access node 106. The processor 112 may be 8-bit, 16-bit, 32-bit, 64-bit or of any other suitable architecture. The processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 112 may include other hardware that operates software to control and process information. The processor 112 executes software stored on memory to perform any of the functions described herein. The processor 112 controls the operation and administration of the access node 106 by processing information (e.g., information received from the devices 102, network 108, and memory 114). The processor 112 may be a programmable logic device, a microcontroller, a microprocessor, any suitable processing device, or any suitable combination of the preceding. The processor 112 is not limited to a single processing device and may encompass multiple processing devices.

The memory 114 may store, either permanently or temporarily, data, operational software, or other information for the processor 112. The memory 114 may include any one or a combination of volatile or non-volatile local or remote devices suitable for storing information. For example, the memory 114 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 114, a disk, a CD, or a flash drive. In particular embodiments, the software may include an application executable by the processor 112 to perform one or more of the functions described herein.

The access node 106 broadcasts an identity of the access node 106 or of the network 108. When a device 102 is within the broadcast range of the access node 106, the device 102 may attempt to connect to the access node 106 by communicating a connection request 116 to the access node 106. The connection request 116 may include an identifier of the device 102 and an identity of the identity provider 110. In response to receiving the connection request 116, the access node 106 may open and establish a connection with the identity provider 110. For example, the access node may open a communication tunnel 118 between the device 102 and the identity provider 110. The tunnel 118 may pass through the access node 106 and the network 108 to the identity provider 110. In some embodiments, the tunnel 118 is between the access node 106 and the identity provider 110. The device 102 may communicate with the access node 106, and the access node 106 may communicate with the identity provider 110 through the tunnel 118.

The device 102 may authenticate itself with the identity provider 110 through the communication tunnel 118. For example, the device 102 may communicate credentials directly to the identity provider 110 through the communication tunnel 118, or the device 102 may communicate credentials to the access node 106 and the access node 106 may forward those credentials to the identity provider 110 through the tunnel 118. The identity provider 110 may then determine whether the credentials match stored credentials. If the credentials match the stored credentials, then the identity provider 110 may consider the device 102 authenticated. If the credentials do not match the stored credentials, then the identity provider 110 may consider the device 102 unauthenticated. After the device 102 is authenticated, the access node 106 may allow the device 102 to send and receive communications over the network 108 through the access node 106.

In certain embodiments, the device 102, the access node 106, the network 108, and/or the identity provider 110 belong to an identity federation (e.g., OpenRoaming), which may be a trusted third party service that enables remote authentication of a third party device 102 across different access nodes 106. In these embodiments, the third party service provides access to the identity provider 110 so the access node 106 can rely on the identity provider 110 to authenticate the device 102. For example, when authentication is needed, the access node 106 may open a secure communication tunnel 118 between the device 102 and the identity provider 110 through the network 108. The identity provider 110 may then authenticate the device 102. For example, the device 102 may provide credentials (e.g., credentials of the device 102) to the identity provider 110. The identity provider 110 may use these credentials to authenticate the device 102. The identity provider 110 may then provide an application identifier (e.g., a token) enabling communications to device 102 once it is authenticated. The identity provider 110 may provide the application identifier to the access node 106. If an application identifier is provided to the access node 106, then the access node 106 may directly use the application identifier or forward it so another local device (e.g., a handler 130) can initiate a communication session with the device 102. The access node 106 may also provide an application identifier (e.g., a token) to the identity provider 110 after the device 102 is authenticated. In this sense, metadata may be exchanged bidirectionally between the access node 106 and the identity provider 110. If an application identifier is provided to the identity provider 110, then the latter may directly use the application identifier or forward it to device 102, so it can initiate a communication session with a local device (e.g., a handler 130). In this manner, the device 102 may connect to any access node 106 or network 108 that belongs to the identity federation. As a result, the device 102 may automatically and seamlessly connect to these access nodes 106 or networks 108 as the device moves or roams between these separate networks 108. Additionally, the access nodes 106 and networks 108 that belong to the identity federation do not need to store and maintain the credentials of the device 102.

After the device 102 is authenticated, the identity provider 110 provides additional information about the device 102 to the access node of 106 so that the access node 106 may provide enhanced services to the device 102. The access node 106 receives metadata 120 from the identity provider 110. The metadata 120 may include any suitable information about the device 102. The access node 106 may use the metadata 120 to generate links 122 for the device 102.

For example, the metadata 120 may identify an item 124 in the container 104 to which the device 102 is coupled. The metadata 120 may also identify an owner 126 of the device 102 or the container 104. The access node 106 may use this information to generate a link 122 that links the device 102 to the item 124 or the owner 126 or the container 104. In this manner, the access node 106 may determine the item 124 in the container 104 or the owner 126 of the container 104 based on the connections with the device 102 and the identity provider 110. If the container 104 is unmarked or if there is no record that indicates the contents and owner of the container 104, the access node 106 is still provided with that information after the device 102 connects with the access node 106.

In some embodiments, the metadata 120 may include additional information about the device 102. For example, the metadata 120 may include a key 128 (e.g., a digital key). The key 128 may be used to unlock a digital lock on the container 104 to which the device 102 is coupled. The access node 106 may communicate the key 128 to a handler of the container 104 so that the handler can unlock and open the container 104. In this manner, an owner of the container 104 may be reasonably assured that the key 128 to the container 104 is being sent to a handler of the container 104, and not to a malicious user.

As another example, the metadata 120 may identify a handler 130 of the device 102 or the container 104. The access node 106 may use this information to notify the handler 130 of a location of the container 104. Additionally, the access node 106 may notify the handler 130 of where the container 104 should be moved. The access node 106 may generate and communicate a notification of 136 to the handler 130 to instruct the handler 130 of where to move the container 104. In response, the handler 130 may move the container 104 to the indicated location. For example, the handler 130 may move the container 104 to a station where the container 104 will be shipped to its next location. In some embodiments, the access node 106 may restrict communications for the device 102 after the device 102 is authenticated so that the device 102 may communicate only with the handler 130. In particular embodiments, the metadata 120 may not include an identifier of the handler 130, but the access node 106 may infer or determine the handler 130 based on other information (e.g., the identity provider 110, the item 124, or the owner 126). In certain embodiments, the portion of the metadata 120 that identifies the handler 130 is communicated separate from other portions of the metadata 120. For example, the access node 106 may first communicate an identifier for an owner 138 of the access node 106 to the identity provider 110. The identity provider 110 may then communicate the identifier for the handler 130 to the access node 106.

As another example, the metadata 120 may identify a device 132. The identified device 132 may be a second device 132 that is coupled to the same container 104 as the device 102. The device 132 may communicate with the access node 106 over a different communication protocol than the device 102. For example, the device 102 may communicate with the access node 106 over WiFi while the device 132 communicates with the access node 106 over cellular. The access node 106 may use this information to identify connection requests from devices that are coupled to the same container 104. Once one device 102 has been authenticated and is connected with the access node 106, the access node 106 may ignore or discard connection requests from the other device 132. For example, after a device 102 has been authenticated and connected to the access node 106, the access node 106 may receive a connection request 134 from the device 132 that is coupled to the same container 104 as the device 102. The access node 106 may determine that the connection request 134 is from the device 132 and, based on the metadata 120, that the device 132 is linked with the device 102. In response, the access node 106 may ignore, discard or accept the connection request 134 without performing another, separate authentication process. In this manner, the access node 106 efficiently handles connection requests from devices 102 that are coupled to the same container 104. As another example, if the container 104 is moved to an area covered by another access node 106 within the same network 108 that communicates using a communication protocol or standard supported by the device 132 but not the device 102, then the device 132 may connect to this other access node 106 without performing another, separate authentication process. Instead, the other access node 106 may determine that the device 132 is coupled to the same container 104 as the device 102 and treat the device 132 as authenticated. For example, the access node 106 may store the metadata 120, including the identifier for the device 132, in other locations on the network 108 (e.g., a database). The other access nodes 106 on the network may access these other locations on the network 108 to retrieve the metadata 120 and to determine, for example, that the device 132 is linked to the device 102. In this manner, the access nodes 106 can perform a handover operation across different communication protocols or standards.

Any number of devices 102 may be attached to the container 104. Each device 102 may support a different communication protocol. In this manner, an owner of the container 104 may be reasonably assured that the container 104 can connect to every location along the container's 104 shipping path.

In embodiments where the device 102 is not attached to a container 104 (e.g., embodiments where the device 102 is a standalone device such as a laptop or mobile phone), the access node 106 may still use the information in the metadata 120 to provide enhanced services to the device 102. For example, the access node 106 may determine from the metadata 120 that the owner 126 of the device 102 is an employee of a company that owns the access node 106. In response, the access node 106 may provide improved data speeds or bandwidth to the device 102. As another example, the access node 106 may determine from the metadata 120 that the device 102 has a particular manufacturer or is a particular model. In response, the access node 106 may provision additional communication resources to the device 102.

In particular embodiments, the identity provider 110 communicates the metadata 120 in-band with the communication tunnel 118 and out-of-band with the information used to authenticate the device 102. In this manner, the security of the metadata 120 is improved, because the same communication tunnel 118 used to communicate the authentication credentials is used to communicate the metadata 120 (although out-of-band with the credentials).

In particular embodiments, the access node 106 communicates to the identity provider 110 an identifier of an owner 138 of the access node 106 after the device 102 has authenticated itself with the identity provider 110. In this manner, the identity provider 110 is notified of the owner 138 of the access node 106 or the network 108 to which the device 102 is connected. Based on this information, the identity provider 110 may determine a location or current handler of the device 102 or the container 104. For example, the identity provider 110 may identify a handler 130 for the container 104 that is an employee of the owner 138. The identity provider 110 may then communicate the identifier of the handler 130 to the access node 106.

The network 108 is any suitable network operable to facilitate communication between the components of the system 100. The network 108 may include any interconnecting system capable of transmitting audio, video, signals, data, messages, or any combination of the preceding. The network 108 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

In this manner, the metadata 120 allows the access node 106 to dynamically segment the network 108. For example, if the access node 106 were located in a warehouse or port, after a device 102 connects and authenticates, the metadata 120 may allow the network node 106 to determine the type of the device 102, the type of the container 104 coupled to the device 102, an item in the container 104, the owner of the container 104, who or what should discover or handle the container 104 or the device 102, how to unlock the container 104, or where the container 104 should be moved. These determinations may improve the handling and tracking of the container 104, especially if the warehouse or port is unmanned.

Figure 2:
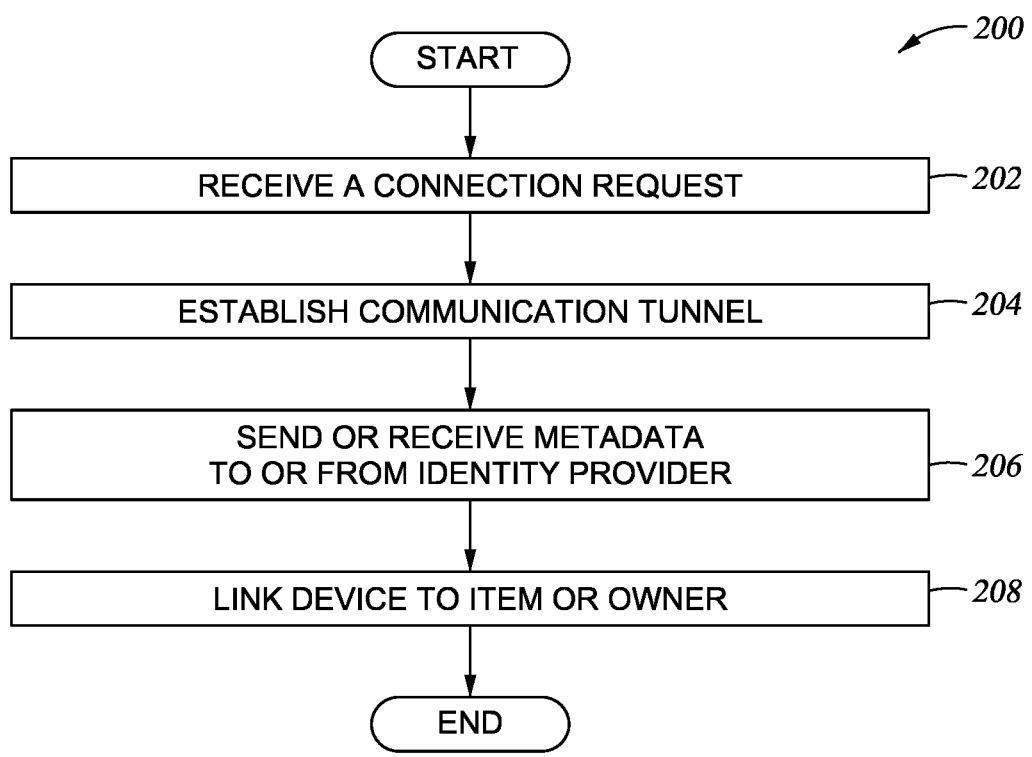
FIG. 2 is a flowchart of an example method in the system of FIG. 1.

FIG. 2 is a flowchart of an example method 200 in the system 100 of FIG. 1. The access node 106 performs the method 200. In particular embodiments, by performing the method 200, the access node 106 provides enhanced services to a connecting device 102.

In block 202, the access node 106 receives a communication request 116 from a wireless device 102. The device 102 may be attached to a container 104. The device 102 may have communicated the connection request 116 when the device 102 moved within the broadcast range of the access node 106. The connection request 116 may include an identifier of the device 102 and an identifier of an identity provider 110.

In block 204, the access node 106 establishes a communication tunnel 118. The communication tunnel 118 may be between the device 102 and the identity provider 110. In some embodiments, the communication tunnel 118 may be between the access node 106 and the identity provider 110. The access node 106 may establish the communication tunnel 118 using information in the connection request 116. After the tunnel 118 is established, the device 102 may authenticate itself with the identity provider 110 through the tunnel 118. After the device 102 is authenticated, the access node 106 may allow the device 102 to communicate over a network 108 through the access node 106.

After the device 102 is authenticated with the identity provider 110, the identity provider 110 may communicate metadata 120 to the access node 106. In block 206, the access node 106 sends or receives the metadata 120 to or from the identity provider 110. The metadata 120 may include information about the device 102 or container 104 to which the device 102 is coupled. The access node 106 may use the information in the metadata 120 to provide enhanced services to the device 102 or the container 104. For example, the metadata 120 may identify an item 124 in the container 104 or owner 126 of the container 104. As another example, the metadata 120 may include a key 128 that could be used to unlock the container 104. As yet another example, the metadata 120 may include an identifier of a handler 130 for the container 104. The metadata 120 may also include an identifier of a second device 132 that is coupled to the same container 104 as the device 102.

In block 208, the access node 106 generates a link 122 between the device 102 and the item 124 or the owner 126. In this manner, the access node 106 may determine the item 124 in the container 104 or owner 126 of the container 104 based solely on the connection with the device 102.

Figure 3:
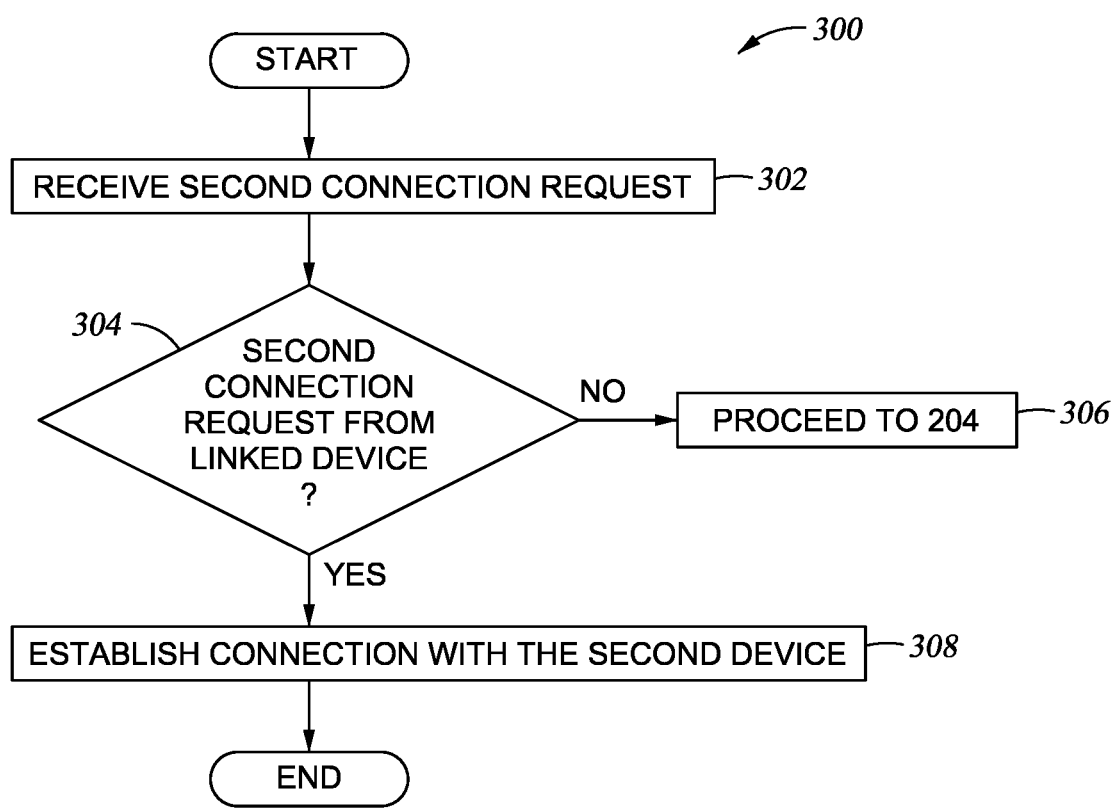
FIG. 3 is a flowchart of an example method in the system of FIG. 1.

FIG. 3 is a flowchart of an example method 300 in the system 100 of FIG. 1. The access node 106 may perform the method 300 after the method 200 in FIG. 2. In particular embodiments, by performing the method 300, the access node 106 efficiently handles connection requests from multiple devices 102 that are coupled to the same container 104.

In block 302, the access node 106 receives a second connection request 134 from a second device 132. The second connection request 134 may include an identifier of the second device 132 that sent the connection request 134. The access node 106 may use this information to determine whether the second device 132 is coupled to the same container 104 as the previous device 102 that sent the connection request 116 in the method 200 of FIG. 2. For example, the access node 106 may use the previously communicated metadata 120 to see if that metadata 120 includes an identifier of the second device 132.

In block 304, the access node 106 determines whether the second device 132 that sent the connection request 134 is linked to the previous device 102 that sent the connection request 116, for example, by determining whether the metadata 120 includes an identifier of the second device 132 If so, then the access node 106 determines that the second device 132 is linked to the previous device 102 and is coupled to the same container 104 as the device 102. If the metadata 120 did not include an identifier for the second device 132, then the access node 106 proceeds to block 204 in block 306. Stated differently, the access node 106 authenticates the second device 132 by establishing a tunnel 118 between the identity provider 110 and the second device 132. If the metadata included an identifier for the second device 132, then the access node 106 establishes a connection with the second device 132 in block 308. The access node 106 may not require the second device 132 to perform a separate authentication process.

Figure 4:
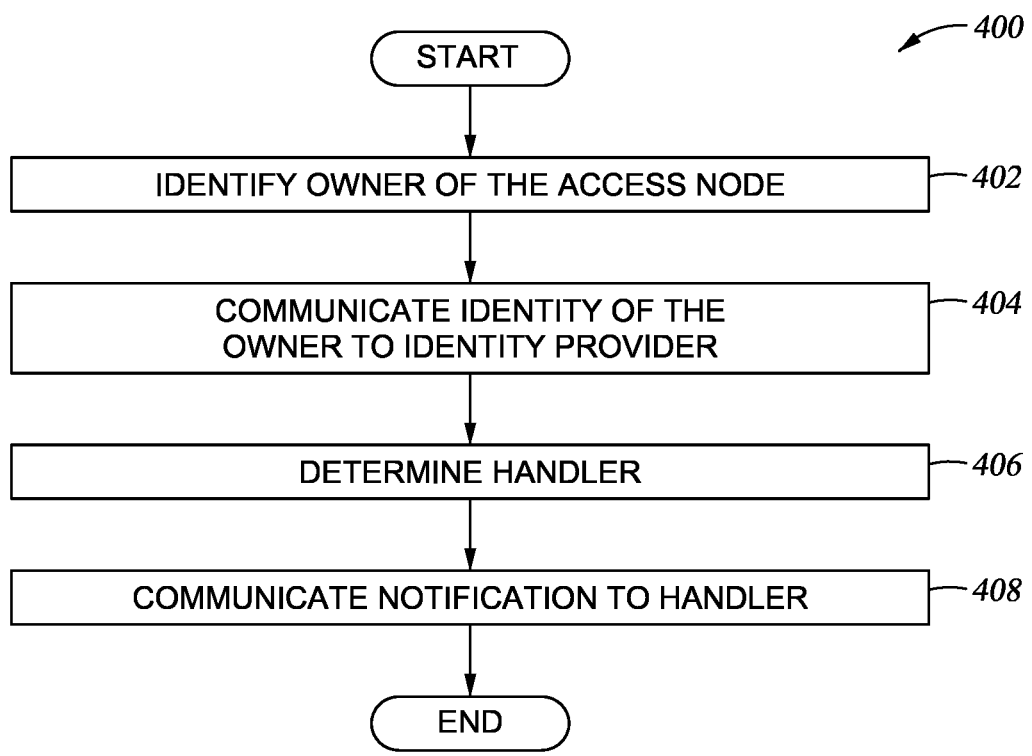
FIG. 4 is a flowchart of an example method in the system of FIG. 1.

FIG. 4 is a flowchart of an example method 400 in the system 100 of FIG. 1. The access node 106 performs the method 400. The method 400 may be performed after the method 200 in FIG. 2. In particular embodiments, by performing the method 400, the access node 106 provides enhanced services to a connecting device 102.

In block 402, the access node 106 identifies an owner 138 of the access node 106. For example, if the access node 106 is located in a warehouse, then the owner 138 may be an owner of the warehouse. As another example, if the access node 106 is located in an airport, then the owner 138 may be a company that owns the network infrastructure in the airport. In block 404, the access node 106 communicates the identity of the owner 138 to the identity provider 110. The identity provider 110 may use this information to determine an entity that is holding the container 104. The identity provider 110 may then determine a suitable handler 130 for the container 104 and communicate the identifier for the handler 130 to the access node 106. As a result, the access node 106 may communicate the identifier of the handler 130 separate from the other portions of the metadata 120.

In block 406, the access node 106 determines the handler 130. In certain embodiments, the metadata 120 includes an identifier of the handler 130 and the access node 106 uses this identifier to identify the handler 130. In some embodiments, the access node 106 uses other information to infer or determine the handler 130. For example, the access node 106 may use an identity of the identity provider 110, the item 124, or the owner 126 to determine a suitable handler 130. The handler 130 may be an individual who is responsible for moving and maintaining the container 104 to which a connecting device 102 is attached.

In block 408, the access node 106 communicates a notification 136 to the handler 130. The notification 136 may inform the handler 130 of the container 104. For example, the notification 136 may include an identifier (e.g., a code) on the container 104. The notification 136 may also include a location of the container 134 or dimensions of the container 104. As another example, the notification 136 may include a picture of the container 134. Additionally, the notification 136 may inform or instruct the handler 130 where to move the container 104.

In summary, an access node 106 exchanges information with an identity provider 110 of an identity federation to provide additional services for a connecting device 102. When the device 102 authenticates itself through the identity provider 110 and connects to the access node 106, the access node 106 may receive additional information about the device 102 or the container 104 from the identity provider 110. For example, the access node 106 may receive information about an item 124 in the container 104, an owner 126 of the container 104, a digital key 128 that can unlock the container 104, and other devices 132 coupled to the container 104. The access node 106 then uses this information to provide additional services to the device 102 and the container 104. For example, the access node 106 can link the device 102 to the item 124 in the container 104 or the owner 126 of the container 104. As another example, the access node 106 can provide the key 128 to a handler 130 of the container 104. As yet another example, the access node 106 can identify and allow connections from the other devices 132. Additionally, the access node 106 can notify a suitable handler 130 to move the container 104 to an appropriate location. In this manner, the access node 106 is supplied information that can be used to provide enhanced services to the device 102, in particular embodiments.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
 receiving, at an access node of a local network, a connection request from a device;
 in response to the connection request, establishing a connection with an identity provider, wherein the device, the access node, the local network, and the identity provider are members of an identity federation; and
 after the device is authenticated with the identity provider, sending or receiving, to or from the identity provider and by the access node, data linking the device to an item or an owner of the device.

2. The method of claim 1, wherein the data is received in-band with the connection and out-of-band with information used to authenticate the device.

3. The method of claim 1, further comprising:
 receiving, at the access node, a second connection request from a second device over a protocol different from a protocol used to receive the connection request;
 determining, at the access node and based on the data, that the second device is linked to the item; and
 in response to determining that the second device is linked to the item, establishing a connection with the second device without authenticating the second device.

4. The method of claim 1, wherein the device is coupled to a container that holds the item.

5. The method of claim 4, wherein the data comprises a key to unlock a lock on the container.

6. The method of claim 1, further comprising communicating, by the access node, a notification about the item based on an identification of a handler in the data.

7. The method of claim 1, further comprising communicating, by the access node and to the identity provider, data identifying an owner of the access node after the device is authenticated with the identity provider.

8. An apparatus comprising:
 a memory; and
 a hardware processor communicatively coupled to the memory, the hardware processor configured to:
  receive a connection request from a device;
  in response to the connection request, establish a connection with an identity provider, wherein the device and the identity provider are members of an identity federation; and
  after the device is authenticated with the identity provider, send or receive, to or from the identity provider, data linking the device to an item or an owner of the device.

9. The apparatus of claim 8, wherein the data is received in-band with the connection and out-of-band with information used to authenticate the device.

10. The apparatus of claim 8, wherein the hardware processor is further configured to:
 receive a second connection request from a second device over a protocol different from a protocol used to receive the connection request;
 determine, based on the data, that the second device is linked to the item; and
 in response to determining that the second device is linked to the item, establish a connection with the second device without authenticating the second device.

11. The apparatus of claim 8, wherein the device is coupled to a container that holds the item.

12. The apparatus of claim 11, wherein the data comprises a key to unlock a lock on the container.

13. The apparatus of claim 8, wherein the hardware processor is further configured to communicate a notification about the item based on an identification of a handler in the data.

14. The apparatus of claim 8, wherein the hardware processor is further configured to communicate, to the identity provider, data identifying an owner of the apparatus after the device is authenticated with the identity provider.

15. An access node comprising:
a memory; and
a hardware processor communicatively coupled to the memory, the hardware processor configured to:
in response to a connection request from a device, establish, a connection with an identity provider, wherein the device and the identity provider are members of an identity federation; and
after the device is authenticated with the identity provider, link, based on data from the identity provider, the device to an item and an owner of the device.

16. The access node of claim 15, wherein the data is received in-band with the connection and out-of-band with information used to authenticate the device.

17. The access node of claim 15, wherein the hardware processor is further configured to:
receive a second connection request from a second device over a protocol different from a protocol used to receive the connection request;
determine, based on the data, that the second device is linked to the item; and
in response to determining that the second device is linked to the item, establish a connection with the second device without authenticating the second device.

18. The access node of claim 15, wherein the device is coupled to a container that holds the item.

19. The access node of claim 18, wherein the data comprises a key to unlock a lock on the container.

20. The access node of claim 15, wherein the hardware processor is further configured to communicate a notification about the item based on an identification of a handler in the data.

\* \* \* \* \*